United States Patent
Allison et al.

(10) Patent No.: US 9,156,124 B2
(45) Date of Patent: Oct. 13, 2015

(54) SOFT POLISHING PAD FOR POLISHING A SEMICONDUCTOR SUBSTRATE

(75) Inventors: William Allison, Beaverton, OR (US); Diane Scott, Portland, OR (US); Robert Kerprich, Portland, OR (US); Ping Huang, St. Louis Park, MN (US); Richard Frentzel, Murrieta, CA (US)

(73) Assignee: NexPlanar Corporation, Hilsboro, OR (US)

( * ) Notice: Subject to any disclaimer, the term of this patent is extended or adjusted under 35 U.S.C. 154(b) by 1229 days.

(21) Appl. No.: 12/832,908

(22) Filed: Jul. 8, 2010

(65) Prior Publication Data

US 2012/0009855 A1 Jan. 12, 2012

(51) Int. Cl.
| | |
|---|---|
| *B24D 11/00* | (2006.01) |
| *B24B 37/20* | (2012.01) |
| *B32B 7/06* | (2006.01) |
| *B32B 27/06* | (2006.01) |
| *B32B 27/36* | (2006.01) |
| *B32B 3/30* | (2006.01) |

(52) U.S. Cl.
CPC ............. *B24B 37/205* (2013.01); *B32B 3/30* (2013.01); *B32B 7/06* (2013.01); *B32B 27/065* (2013.01); *B32B 27/36* (2013.01); *B32B 2266/0278* (2013.01); *B32B 2266/08* (2013.01); *B32B 2457/00* (2013.01)

(58) Field of Classification Search
CPC ...... B24B 37/205; B32B 7/06; B32B 27/065; B32B 3/30; B32B 27/36; B32B 2457/00; B32B 2266/0278; B32B 2266/08
USPC ........................ 451/526, 6, 41, 527
See application file for complete search history.

(56) References Cited

U.S. PATENT DOCUMENTS

| | | | |
|---|---|---|---|
| 3,824,293 A * | 7/1974 | Brode ............................. 568/29 |
| 4,255,486 A * | 3/1981 | Burke et al. .................. 428/356 |
| 5,433,651 A | 7/1995 | Lustig et al. |
| 5,605,760 A | 2/1997 | Roberts |
| 5,609,517 A | 3/1997 | Lofaro |
| 5,733,176 A | 3/1998 | Robinson et al. |
| 5,829,928 A * | 11/1998 | Harmand et al. ........... 408/83.5 |
| 5,893,796 A | 4/1999 | Birang et al. |
| 6,045,439 A | 4/2000 | Birang et al. |
| 6,068,539 A | 5/2000 | Bajaj et al. |
| 6,146,242 A | 11/2000 | Treur et al. |

(Continued)

FOREIGN PATENT DOCUMENTS

| | | |
|---|---|---|
| CN | 101143432 | 3/2008 |
| EP | 2578359 | 4/2013 |

(Continued)

OTHER PUBLICATIONS

International Search Report and Written Opinion from PCT Patent Application No. PCT/US2011/020840, mailed May 9, 2011, 10 pgs.

(Continued)

*Primary Examiner* — Lee D Wilson
*Assistant Examiner* — Joel Crandall
(74) *Attorney, Agent, or Firm* — Blakely Sokoloff Taylor Zafman LLP

(57) ABSTRACT

Soft polishing pads for polishing semiconductor substrates are described. A soft polishing pad includes a molded homogeneous polishing body having a thermoset, closed cell polyurethane material with a hardness approximately in the range of 20 Shore D to 45 Shore D.

28 Claims, 8 Drawing Sheets

(56) References Cited

U.S. PATENT DOCUMENTS

| | | | |
|---|---|---|---|
| 6,171,181 B1 | 1/2001 | Roberts et al. |
| 6,254,459 B1 | 7/2001 | Bajaj et al. |
| 6,280,290 B1 | 8/2001 | Birang et al. |
| 6,358,130 B1 | 3/2002 | Freeman et al. |
| 6,369,156 B1* | 4/2002 | Cron ............................ 524/710 |
| 6,387,312 B1 | 5/2002 | Roberts et al. |
| 6,428,386 B1 | 8/2002 | Barlett |
| 6,454,630 B1 | 9/2002 | Tolles |
| 6,458,014 B1 | 10/2002 | Ihsikawa et al. |
| 6,517,417 B2 | 2/2003 | Budinger et al. |
| 6,524,164 B1 | 2/2003 | Tolles |
| 6,524,176 B1 | 2/2003 | Cheng et al. |
| 6,537,133 B1 | 3/2003 | Birang et al. |
| 6,537,134 B2 | 3/2003 | Newell |
| 6,544,104 B1 | 4/2003 | Koike et al. |
| 6,604,985 B2 | 8/2003 | Muilenburg et al. |
| 6,623,331 B2 | 9/2003 | Sevilla et al. |
| 6,623,337 B2* | 9/2003 | Scott et al. ....................... 451/41 |
| 6,641,470 B1 | 11/2003 | Zhao et al. |
| 6,641,471 B1 | 11/2003 | Pinheiro et al. |
| 6,676,483 B1 | 1/2004 | Roberts |
| 6,676,717 B1 | 1/2004 | Birang et al. |
| 6,685,537 B1 | 2/2004 | Fruitman et al. |
| 6,702,866 B2 | 3/2004 | Kamboj |
| 6,716,085 B2 | 4/2004 | Wiswesser et al. |
| 6,719,818 B1 | 4/2004 | Birang et al. |
| 6,722,249 B2 | 4/2004 | David |
| 6,726,528 B2 | 4/2004 | Barbour |
| 6,752,690 B1 | 6/2004 | Fruitman |
| 6,786,810 B2 | 9/2004 | Muilenburg et al. |
| 6,806,100 B1 | 10/2004 | Zu et al. |
| 6,824,447 B2 | 11/2004 | Takahashi et al. |
| 6,832,947 B2 | 12/2004 | Manning |
| 6,832,949 B2 | 12/2004 | Konno et al. |
| 6,832,950 B2 | 12/2004 | Wright et al. |
| 6,840,843 B2 | 1/2005 | Jones et al. |
| 6,855,034 B2 | 2/2005 | Hasegawa |
| 6,860,791 B2 | 3/2005 | Birang et al. |
| 6,860,793 B2 | 3/2005 | Budinger et al. |
| 6,866,559 B2 | 3/2005 | Lehman et al. |
| 6,875,077 B2 | 4/2005 | Petroski et al. |
| 6,875,078 B2 | 4/2005 | Birang et al. |
| 6,876,454 B1 | 4/2005 | Birang et al. |
| 6,884,150 B2 | 4/2005 | Barbour |
| 6,884,156 B2 | 4/2005 | Prasad et al. |
| 6,896,585 B2 | 5/2005 | Tolles |
| 6,910,944 B2 | 6/2005 | Birang et al. |
| 6,945,846 B1 | 9/2005 | Petroski et al. |
| 6,960,120 B2 | 11/2005 | Prasad |
| 6,984,163 B2 | 1/2006 | Roberts |
| 6,986,700 B2 | 1/2006 | Agarwal |
| 6,986,701 B2 | 1/2006 | Halley et al. |
| 6,986,705 B2 | 1/2006 | Preston et al. |
| 6,994,607 B2* | 2/2006 | Wiswesser .......................... 451/5 |
| 6,997,777 B2 | 2/2006 | Newell |
| 7,011,565 B2 | 3/2006 | Birang et al. |
| 7,018,581 B2 | 3/2006 | David et al. |
| 7,052,368 B2 | 5/2006 | Kim et al. |
| 7,081,044 B2 | 7/2006 | Ohta et al. |
| 7,083,497 B2 | 8/2006 | Halley et al. |
| 7,112,119 B1 | 9/2006 | Swedek et al. |
| 7,118,450 B2 | 10/2006 | Birang et al. |
| 7,118,457 B2 | 10/2006 | Swedek et al. |
| 7,132,033 B2 | 11/2006 | Boldizar et al. |
| 7,160,181 B2 | 1/2007 | Jueng |
| 7,163,437 B1 | 1/2007 | Swedek et al. |
| 7,169,017 B1 | 1/2007 | Saikin |
| 7,179,151 B1 | 2/2007 | Bottema et al. |
| 7,182,670 B2 | 2/2007 | Muldowney |
| 7,183,213 B2 | 2/2007 | Shiho et al. |
| 7,189,141 B2 | 3/2007 | Tolles |
| 7,195,539 B2 | 3/2007 | Turner et al. |
| 7,195,541 B2 | 3/2007 | Wolf |
| 7,198,544 B2 | 4/2007 | Wiswesser |
| 7,204,742 B2 | 4/2007 | Prasad |
| 7,210,980 B2 | 5/2007 | Swedek et |
| 7,226,339 B2 | 6/2007 | Benvegnu et al. |
| 7,229,337 B2 | 6/2007 | Lim et al. |
| 7,238,097 B2 | 7/2007 | Ohno et al. |
| 7,241,408 B2 | 7/2007 | Shih et al. |
| 7,252,871 B2 | 8/2007 | Crkvenac et al. |
| 7,255,629 B2 | 8/2007 | Birang et al. |
| 7,258,602 B2 | 8/2007 | Shih et al. |
| 7,264,536 B2 | 9/2007 | Wiswesser et al. |
| 7,267,607 B2 | 9/2007 | Prasad |
| 7,273,407 B2 | 9/2007 | Saikin |
| 7,291,063 B2 | 11/2007 | Swisher et al. |
| 7,306,507 B2 | 12/2007 | Benvegnu et al. |
| D559,063 S | 1/2008 | Okamoto et al. |
| D559,065 S | 1/2008 | Miyauchi et al. |
| D559,648 S | 1/2008 | Miyauchi et al. |
| D560,457 S | 1/2008 | Miyauchi et al. |
| 7,323,415 B2 | 1/2008 | Shiho et al. |
| 7,354,334 B1 | 4/2008 | Birang et al. |
| 7,371,160 B1* | 5/2008 | Cruz et al. ....................... 451/526 |
| 7,374,477 B2 | 5/2008 | Birang et al. |
| 7,377,840 B2 | 5/2008 | Deopura et al. |
| D576,855 S | 9/2008 | Okamoto et al. |
| 7,425,172 B2 | 9/2008 | Misra et al. |
| 7,429,210 B2 | 9/2008 | Bonner et al. |
| 7,435,165 B2 | 10/2008 | Prasad |
| 7,442,111 B2 | 10/2008 | Lim et al. |
| D581,237 S | 11/2008 | Okamoto et al. |
| 7,455,571 B1 | 11/2008 | Kuo et al. |
| 7,497,763 B2 | 3/2009 | Bottema et al. |
| 7,513,818 B2 | 4/2009 | Miller et al. |
| 7,547,243 B2 | 6/2009 | Wiswesser et al. |
| 7,553,214 B2 | 6/2009 | Menk et al. |
| 7,614,933 B2 | 11/2009 | Benvegnu et al. |
| 7,621,798 B1 | 11/2009 | Bennett et al. |
| 7,651,385 B2 | 1/2010 | Benvegnu et al. |
| 7,662,022 B2 | 2/2010 | Lim et al. |
| 7,704,125 B2* | 4/2010 | Roy et al. ......................... 451/41 |
| 7,927,183 B2* | 4/2011 | Fukuda et al. .................... 451/6 |
| 8,052,507 B2* | 11/2011 | Huang et al. ................... 451/526 |
| 8,257,544 B2* | 9/2012 | Kulp et al. ............... 156/345.12 |
| 8,697,239 B2 | 4/2014 | Kulp et al. |
| 2002/0081946 A1 | 6/2002 | Scott et al. |
| 2002/0137431 A1 | 9/2002 | Labunsky |
| 2003/0171081 A1 | 9/2003 | Komukai et al. |
| 2004/0023597 A1* | 2/2004 | Truong ........................ 451/41 |
| 2004/0082271 A1 | 4/2004 | Wiswesser et al. |
| 2004/0082287 A1* | 4/2004 | Wright et al. ................. 451/490 |
| 2004/0094855 A1 | 5/2004 | Shih et al. |
| 2004/0102141 A1 | 5/2004 | Swisher et al. |
| 2004/0203320 A1 | 10/2004 | Hosaka et al. |
| 2004/0209066 A1 | 10/2004 | Swisher et al. |
| 2004/0224611 A1 | 11/2004 | Aoi et al. |
| 2005/0009448 A1 | 1/2005 | Misra et al. |
| 2005/0148183 A1 | 7/2005 | Shiro et al. |
| 2005/0170751 A1 | 8/2005 | Birang et al. |
| 2005/0173259 A1 | 8/2005 | Mavliev et al. |
| 2005/0221723 A1 | 10/2005 | Duboust et al. |
| 2005/0245171 A1* | 11/2005 | Hosaka et al. ....................... 451/6 |
| 2006/0019587 A1 | 1/2006 | Deopura et al. |
| 2006/0037699 A1 | 2/2006 | Nakamori et al. |
| 2006/0066001 A1* | 3/2006 | Koetas et al. .................. 264/161 |
| 2006/0154568 A1 | 7/2006 | Tolles |
| 2006/0198992 A1 | 9/2006 | Shih et al. |
| 2006/0254706 A1* | 11/2006 | Swisher et al. ............... 156/253 |
| 2006/0276109 A1 | 12/2006 | Roy et al. |
| 2006/0280930 A1* | 12/2006 | Shimomura et al. ....... 428/304.4 |
| 2006/0291530 A1 | 12/2006 | Tregub et al. |
| 2007/0010169 A1 | 1/2007 | Swisher et al. |
| 2007/0015441 A1 | 1/2007 | Birang et al. |
| 2007/0021045 A1 | 1/2007 | Swisher et al. |
| 2007/0037487 A1 | 2/2007 | Kuo et al. |
| 2007/0049169 A1 | 3/2007 | Viadya et al. |
| 2007/0093191 A1 | 4/2007 | Wang et al. |
| 2007/0190905 A1 | 8/2007 | Shimomura et al. |
| 2007/0197134 A1 | 8/2007 | Menk et al. |
| 2007/0197145 A1 | 8/2007 | Menk et al. |
| 2007/0275226 A1* | 11/2007 | Kulp ........................ 428/304.4 |
| 2008/0003923 A1 | 1/2008 | Benvegnu et al. |

(56) References Cited

U.S. PATENT DOCUMENTS

| | | | |
|---|---|---|---|
| 2008/0090498 A1 | 4/2008 | Misra et al. | |
| 2008/0200102 A1* | 8/2008 | Feng et al. | 451/59 |
| 2008/0207100 A1 | 8/2008 | Roy et al. | |
| 2008/0211141 A1 | 9/2008 | Deopura et al. | |
| 2008/0305729 A1 | 12/2008 | Benvagnu et al. | |
| 2009/0023363 A1 | 1/2009 | Bottema et al. | |
| 2009/0053976 A1 | 2/2009 | Roy et al. | |
| 2009/0137188 A1 | 5/2009 | Fukuda et al. | |
| 2009/0137189 A1 | 5/2009 | Fukuda et al. | |
| 2009/0142989 A1 | 6/2009 | Lefevre et al. | |
| 2009/0253353 A1 | 10/2009 | Ogawa et al. | |
| 2009/0305610 A1 | 12/2009 | Yilmaz et al. | |
| 2009/0311955 A1 | 12/2009 | Kerprich et al. | |
| 2009/0318061 A1 | 12/2009 | Taylor et al. | |
| 2010/0035519 A1 | 2/2010 | Benvegnu et al. | |
| 2011/0177758 A1* | 7/2011 | Loyack et al. | 451/6 |

FOREIGN PATENT DOCUMENTS

| | | |
|---|---|---|
| JP | 11-322877 | 11/1999 |
| JP | 11322877 | 11/1999 |
| JP | 2002001647 | 1/2002 |
| JP | 2008229843 | 10/2008 |
| JP | 2010058220 | 3/2010 |
| TW | 491755 | 6/2002 |
| TW | 200408494 | 6/2004 |
| TW | 200835577 | 9/2008 |
| TW | 200940613 | 10/2009 |
| WO | WO-2004028744 | 4/2004 |
| WO | WO-2005000529 | 1/2005 |
| WO | WO-2006081286 | 8/2006 |
| WO | WO-2006089293 | 8/2006 |
| WO | WO-2008114805 | 9/2008 |
| WO | WO 2010/038724 | 4/2010 |
| WO | WO-2010038724 | 4/2010 |

OTHER PUBLICATIONS

International Preliminary Report on Patentability from PCT/US2011/020840 mailed Jan. 17, 2013, 7 pgs.

Third Party Observation filed on Jun. 6, 2014 in Japanese Patent Application No. 2013-518379 6 pgs.

Office Action for Chinese Patent Application No. 201180043031.X, mailed Sep. 12, 2014, 11 pgs.

Office Action for European Patent Application No. 11700490.3, mailed Aug. 26, 2014, 4 pgs.

Final Office Action for Japanese Patent Application No. 2013-518379, mailed Sep. 8, 2014, 5 pgs.

Office Action for Japanese Patent Application No. 2013-518379, mailed Feb. 3, 2014, 13 pgs.

Third Party Observation (Translation) filed on Jun. 6, 2014 in Japanese Patent Application No. 2013-518379 61 pgs.

Office Action for Korean Patent Application No. 10-2013-7001876, mailed Nov. 20, 2014, 11 pgs.

Office Action for Korean Patent Application No. 10-2013-7001876, mailed Nov. May 22, 2014, 8 pgs.

Written Opinion from Singapore Application No. 201300033-6 mailed Jan. 22, 2014, 4 pgs.

Search Report from Taiwan Patent Application 100101304 mailed Aug. 7, 2014, 1 pg.

Search Report from Taiwan Patent Application 100101304 mailed Sep. 16, 2013, 1 pg.

* cited by examiner

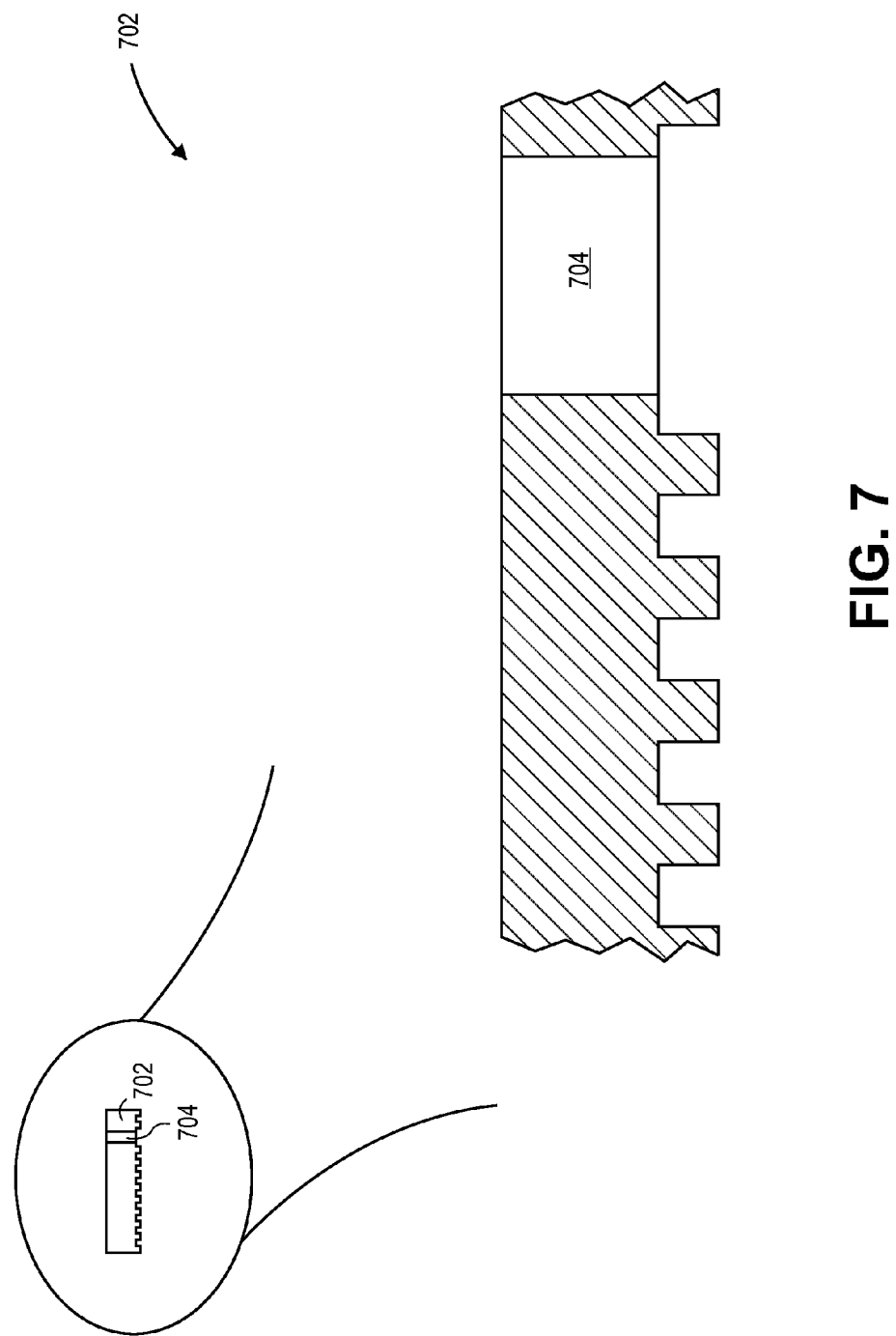

SOFT POLISHING PAD FOR POLISHING A SEMICONDUCTOR SUBSTRATE

TECHNICAL FIELD

Embodiments of the present invention are in the field of chemical mechanical polishing (CMP) and, in particular, soft polishing pads for polishing semiconductor substrates.

BACKGROUND

Chemical-mechanical planarization or chemical-mechanical polishing, commonly abbreviated CMP, is a technique used in semiconductor fabrication for planarizing a semiconductor wafer or other substrate.

The process uses an abrasive and corrosive chemical slurry (commonly a colloid) in conjunction with a polishing pad and retaining ring, typically of a greater diameter than the wafer. The pad and wafer are pressed together by a dynamic polishing head and held in place by a plastic retaining ring. The dynamic polishing head is rotated with different axes of rotation (i.e., not concentric). This removes material and tends to even out any irregular topography, making the wafer flat or planar. This may be necessary in order to set up the wafer for the formation of additional circuit elements. For example, this might be necessary in order to bring the entire surface within the depth of field of a photolithography system, or to selectively remove material based on its position. Typical depth-of-field requirements are down to Angstrom levels for the latest 45 nm technology node.

The process of material removal is not simply that of abrasive scraping, like sandpaper on wood. The chemicals in the slurry also react with and/or weaken the material to be removed. The abrasive accelerates this weakening process and the polishing pad helps to wipe the reacted materials from the surface. The process has been likened to that of a child eating a gummy candy. If the candy sits on the tongue without being scraped around, the candy becomes covered with a gel coating, but the majority of the candy is not affected. Only with a vigorous scraping does the candy dissolve away. Another analogy is the act of brushing one's teeth. The toothbrush is the mechanical part and the toothpaste is the chemical part. Using either the toothbrush or the toothpaste alone will get one's teeth somewhat clean, but using the toothbrush and toothpaste together makes a superior process.

Accordingly, in addition to advances in slurry technology, the polishing pad plays a significant role in increasingly complex CMP operations. However, additional improvements are needed in the evolution of CMP pad technology.

SUMMARY

In an embodiment, a soft polishing pad includes a molded homogeneous polishing body including a thermoset, closed cell polyurethane material having a hardness approximately in the range of 20 Shore D to 45 Shore D.

In another embodiment, a soft polishing pad includes a local area transparency (LAT) region disposed in, and covalently bonded with, a molded homogeneous polishing body including a thermoset, closed cell polyurethane material having a hardness approximately in the range of 20 Shore D to 45 Shore D.

In another embodiment, a method of fabricating a soft polishing pad for polishing a semiconductor substrate includes mixing, in a formation mold, a pre-polymer, a primary curative, and a secondary curative different from the primary curative to form a mixture. The method also includes curing the mixture to provide a molded homogeneous polishing body including a thermoset, closed cell polyurethane material having a hardness approximately in the range of 20 Shore D to 45 Shore D.

In another embodiment, a method of fabricating a soft polishing pad for polishing a semiconductor substrate includes, prior to mixing a pre-polymer and a primary curative and a secondary curative in a formation mold, mixing an aromatic urethane pre-polymer with a curative in a second, separate, formation mold to form a second mixture. The method also includes partially curing, in the second formation mold, the second mixture to form a molded gel. The method also includes positioning the molded gel in a designated region of the formation mold. Then, mixing the pre-polymer and the primary curative and the secondary curative to form the mixture includes forming the mixture at least partially surrounding the molded gel. Curing the mixture to provide the molded homogeneous polishing body further includes curing the molded gel to provide a local area transparency (LAT) region disposed in, and covalently bonded with, the molded homogeneous polishing body.

BRIEF DESCRIPTION OF THE DRAWINGS

FIG. 7 illustrates a cross-sectional view of a soft polishing pad for polishing a semiconductor substrate, the soft polishing pad including a local area transparency (LAT) region, in accordance with an embodiment of the present invention.

DETAILED DESCRIPTION

Soft polishing pads for polishing semiconductor substrates are described herein. In the following description, numerous specific details are set forth, such as specific soft polishing pad and local area transparency (LAT) formulation mixtures, in order to provide a thorough understanding of embodiments of the present invention. It will be apparent to one skilled in the art that embodiments of the present invention may be practiced without these specific details. In other instances, well-known processing techniques, such as the combination of a slurry with a polishing pad to perform CMP of a semiconductor substrate, are not described in detail in order to not unnecessarily obscure embodiments of the present invention. Furthermore, it is to be understood that the various embodiments shown in the figures are illustrative representations and are not necessarily drawn to scale.

Disclosed herein are soft polishing pads for polishing semiconductor substrates. In one embodiment, a soft polishing pad includes a molded homogeneous polishing body including a thermoset, closed cell polyurethane material having a hardness approximately in the range of 20 Shore D to 45 Shore D. In one embodiment, a soft polishing pad includes a local area transparency (LAT) region disposed in, and covalently bonded with, the molded homogeneous polishing body. In one embodiment, a soft polishing pad includes a molded homogeneous polishing body including a thermoset, closed cell polyurethane material having a hardness approximately in the range of 60 Shore A to 95 Shore A.

Also disclosed herein are methods of fabricating soft polishing pads for polishing semiconductor substrates. In one embodiment, a method includes mixing, in a formation mold, a pre-polymer, a primary curative, and a secondary curative different from the primary curative to form a mixture. The mixture is cured to provide a molded homogeneous polishing body including a thermoset, closed cell polyurethane material having a hardness approximately in the range of 20 Shore D to 45 Shore D. In one embodiment, a method includes, prior to mixing the pre-polymer and the primary curative and the secondary curative, mixing an aromatic urethane pre-polymer with a curative in a second, separate, formation mold to form a second mixture. In the second formation mold, the second mixture is partially cured to form a molded gel. The molded gel is positioned in a designated region of the formation mold. In that embodiment, mixing the pre-polymer and the primary curative and the secondary curative to form the mixture includes forming the mixture at least partially surrounding the molded gel, and curing the mixture to provide the molded homogeneous polishing body further includes curing the molded gel to provide a local area transparency region disposed in, and covalently bonded with, the molded homogeneous polishing body.

Figure 1:
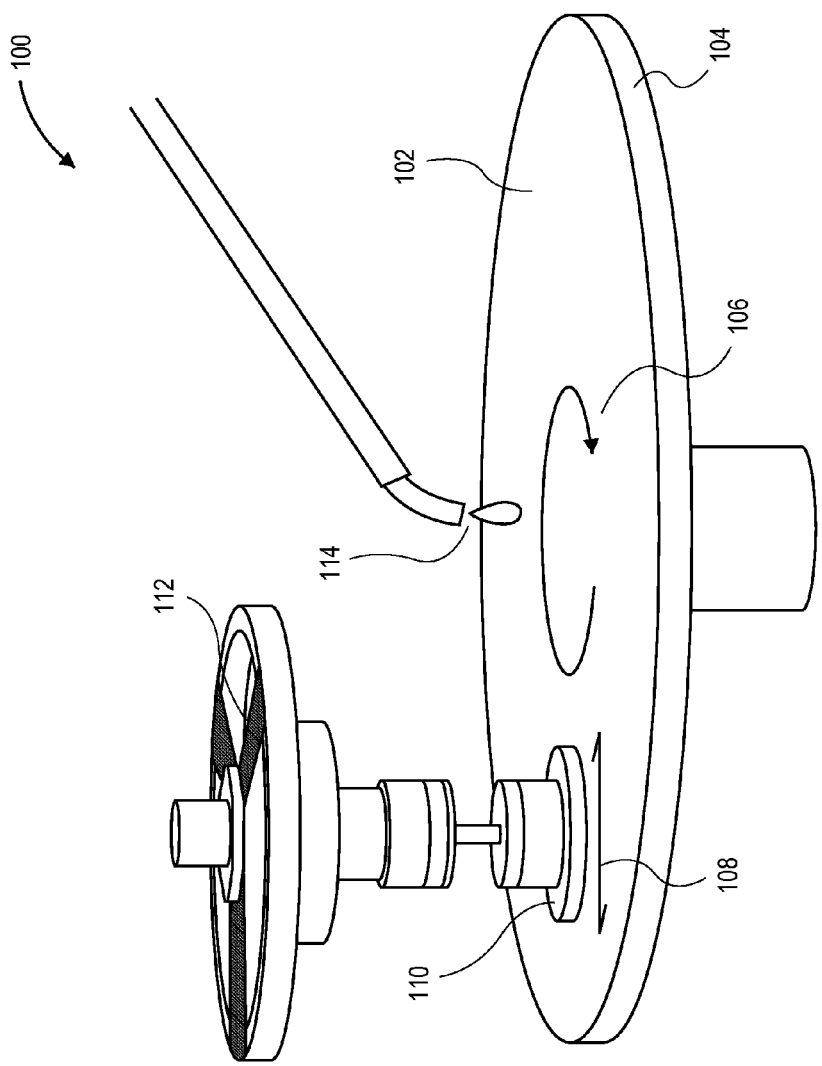
FIG. 1 illustrates an isometric side-on view of a polishing apparatus compatible with a soft polishing pad for polishing a semiconductor substrate, in accordance with an embodiment of the present invention.

Soft polishing pads described herein may be suitable for use chemical mechanical polishing apparatuses. FIG. 1 illustrates an isometric side-on view of a polishing apparatus compatible with a soft polishing pad for polishing a semiconductor substrate, in accordance with an embodiment of the present invention.

Referring to FIG. 1 a polishing apparatus 100 includes a platen 104. The top surface 102 of platen 104 may be used to support a soft polishing pad. Platen 104 may be configured to provide spindle rotation 106 and slider oscillation 108. A sample carrier 110 is used to hold, e.g., a semiconductor wafer in place during polishing of the semiconductor wafer with a soft polishing pad. Sample carrier is further supported by a suspension mechanism 112. A slurry feed 114 is included for providing slurry to a surface of a soft polishing pad prior to and during polishing of the semiconductor wafer.

In accordance with an embodiment of the present invention, a "soft" pad (soft in relative Shore D values to conventional pads) is provided for use with a polishing apparatus, such as polishing apparatus 100. The soft polishing pad may be used in chemical mechanical polishing (CMP) of semiconductor substrates. In an embodiment, the soft polishing pad is a cylindrical closed cell, thermoset polyurethane pad approximately 20 inches (e.g., approximately in the range of 50-52 centimeters) or approximately 30 inches (e.g., approximately in the range of 75-78 centimeters) in diameter. The soft polishing pad may each have an opaque portion with an optional local area transparency portion. In accordance with another embodiment of the present invention, the soft polishing pad is a cylindrical closed cell, thermoset polyurethane pad having a diameter approximately in the range of 42-48 inches and is suitable for 450 mm wafer processing.

In an embodiment, the upper part of each polyurethane pad is a polishing surface having a grooved design, e.g., for contacting a semiconductor substrate during polishing on a polishing apparatus such as polishing apparatus 100. In an embodiment, the flat bottom surface of the polyurethane pad is covered completely with a polyethylene teraphthalate (PET) carrier film with a thickness approximately in the range of 0.5-3 mils, and that is ideally approximately 0.5 mils thick (e.g., approximately in the range of 10-15 microns thick). The PET carrier film may be semi-transparent to light. The PET carrier film may be adhered to the bottom pad surface via a first pressure sensitive adhesive that completely covers that one side of the PET carrier film. In one embodiment, completely covering the other side of the PET carrier film is a second pressure sensitive adhesive layer. A PET release liner that is approximately 2.5 mils thick (e.g., approximately in the range of 60-65 microns) may be attached to the PET carrier film via this second pressure sensitive adhesive. In one embodiment, the first pressure sensitive adhesive is a rubber type, while the second pressure sensitive adhesive is an acrylic type. In an alternative embodiment, the PET carrier film and one of the pressure sensitive adhesives is omitted so that the PET release liner is directly adhered to the bottom surface of the polyurethane pad by a single layer of pressure sensitive adhesive.

Figure 2:
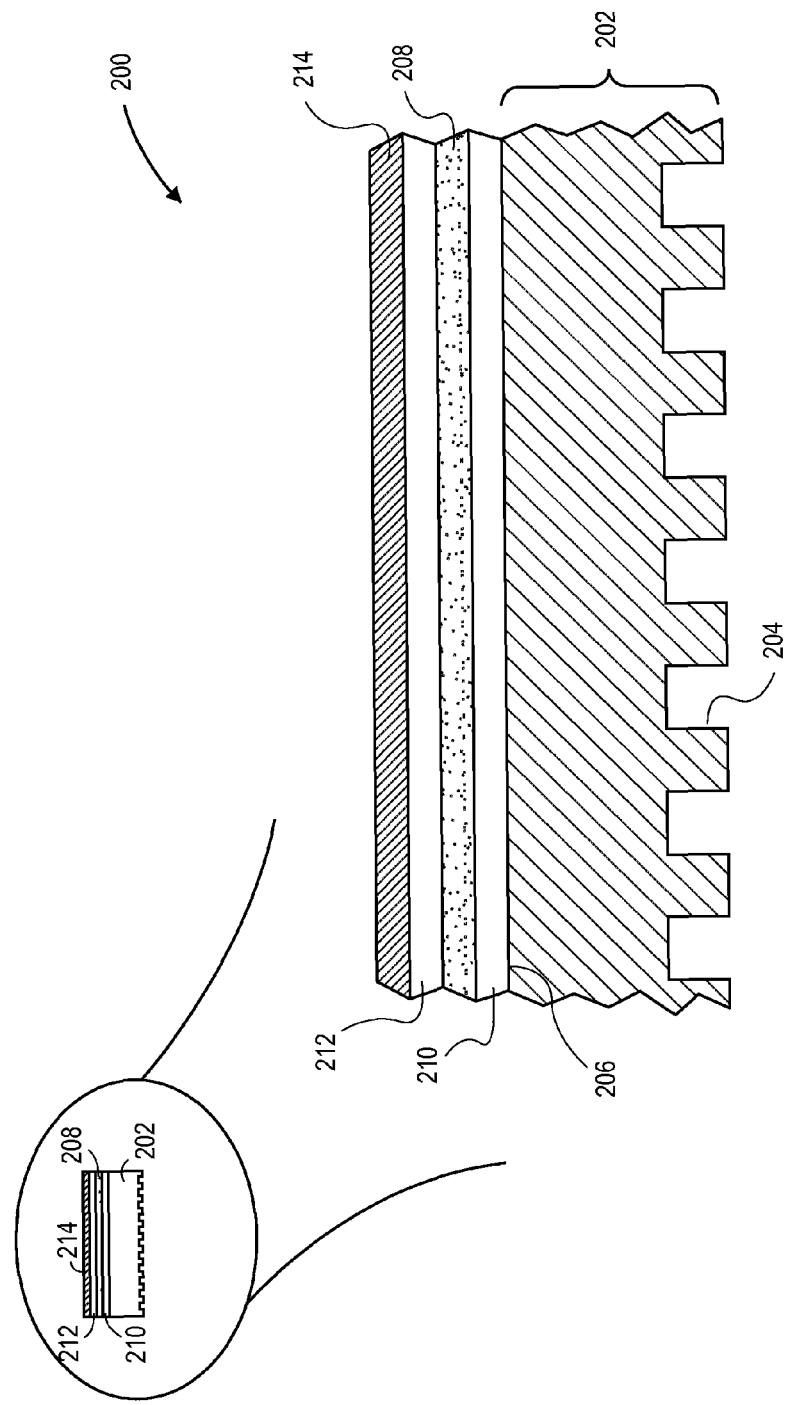
FIG. 2 illustrates a cross-sectional view of a soft polishing pad for polishing a semiconductor substrate, in accordance with an embodiment of the present invention.

In an aspect of the present invention, a soft polishing pad for use in chemical mechanical polishing of semiconductor substrate surfaces is provided. FIG. 2 illustrates a cross-sectional view of a soft polishing pad for polishing a semiconductor substrate, in accordance with an embodiment of the present invention.

Referring to FIG. 2, a soft polishing pad 200 includes a molded homogeneous polishing body 202 composed of a thermoset, closed cell polyurethane material having a hardness approximately in the range of 20 Shore D to 45 Shore D. In an embodiment, the term "homogeneous" is used to indicate that the composition of the thermoset, closed cell polyurethane material is consistent throughout the entire composition of the polishing body. For example, in an embodiment, the term "homogeneous" excludes polishing pads composed of, e.g., impregnated felt or a composition (composite) of multiple layers of differing material. In an embodiment, the term "thermoset" is used to indicate a polymer material that irreversibly cures, e.g., the precursor to the material changes irreversibly into an infusible, insoluble polymer network by curing. For example, in an embodiment, the term "thermoset" excludes polishing pads composed of, e.g., "thermoplast" materials or "thermoplastics"—those materials composed of a polymer that turns to a liquid when heated and freezes to a very glassy state when cooled sufficiently. In an embodiment, the term "molded" is used to indicate that molded homogeneous polishing body 202 is formed in a formation mold, as described in more detail below.

Figure 3:
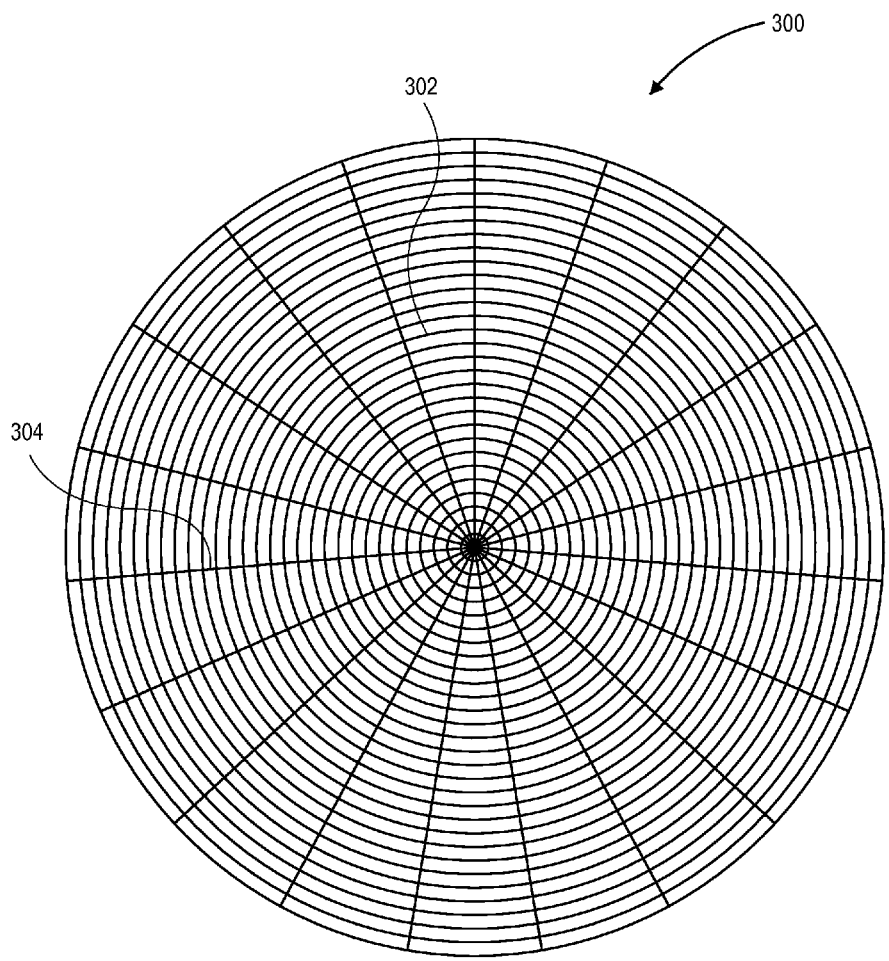
FIG. 3 illustrates a top-down view of a soft polishing pad for polishing a semiconductor substrate, in accordance with an embodiment of the present invention.

In an embodiment, molded homogeneous polishing body 202 includes a first, grooved surface 204, and a second, flat surface 206 opposite the first surface 204. As an example of a pattern for first, grooved surface 204, FIG. 3 illustrates a top-down view of a soft polishing pad for polishing a semiconductor substrate, in accordance with an embodiment of the present invention. Referring to FIG. 3, a molded homogeneous polishing body 300 includes a grooved surface having, e.g., a plurality of concentric circles 302 along with a plurality of radial lines 304.

In an embodiment, molded homogeneous polishing body 202 is opaque. In one embodiment, the term "opaque" is used to indicate a material that allows approximately 10% or less visible light to pass. In one embodiment, molded homogeneous polishing body 202 is opaque in most part, or due entirely to, the inclusion of an opacifying lubricant throughout (e.g., as an additional component in) the homogeneous thermoset, closed cell polyurethane material of molded homogeneous polishing body 202. In accordance with an embodiment of the present invention, the opacifying lubricant is a material such as, but not limited to, graphite, boron nitride, tungsten disulfide, Teflon, Cerium fluoride, Molybdenum sulfide, Graphite fluoride, Niobium sulfide, Tantalum sulfide, or talc.

In an embodiment, molded homogeneous polishing body 202 includes porogens. In one embodiment, the term "porogen" is used to indicate micro- or nano-scale spherical particles with "hollow" centers. The hollow centers are not filled with solid material, but may rather include a gaseous or liquid core. In one embodiment, molded homogeneous polishing body 202 includes as porogens pre-expanded and gas-filled EXPANCEL throughout (e.g., as an additional component in) the homogeneous thermoset, closed cell polyurethane material of molded homogeneous polishing body 202. In a specific embodiment, the EXPANCEL is filled with pentane.

Referring again to FIG. 2, soft polishing pad 200 further includes a carrier film 208 disposed above molded homogeneous polishing body 202. In an embodiment, carrier film 208 is composed of polyethylene teraphthalate (PET). In one embodiment, carrier film 208 has a thickness of approximately 0.5 mils, e.g., approximately in the range of 10-15 microns. In one embodiment, carrier film 208 is semi-transparent to light.

Referring again to FIG. 2, soft polishing pad 200 further includes a first pressure-sensitive adhesive layer 210 disposed between carrier film 208 and molded homogeneous polishing body 202. In an embodiment, first pressure-sensitive adhesive layer 210 is composed of a rubber-type material.

Referring again to FIG. 2, soft polishing pad 200 further includes a second pressure-sensitive adhesive layer 212 disposed above carrier film 208. In an embodiment, second pressure-sensitive adhesive layer 212 is composed of an acrylic-type material.

Referring again to FIG. 2, soft polishing pad 200 further includes a release liner 214 disposed above second pressure-sensitive adhesive layer 212. In an embodiment, release liner 214 is composed of polyethylene teraphthalate (PET). In an alternative embodiment (not shown), soft polishing pad 200 further includes a release liner disposed directly on molded homogeneous polishing body 202, without intervening carrier film or first and second pressure-sensitive adhesive layers.

It is to be understood that the sizing of molded homogeneous polishing body 202 may be varied according to application. Nonetheless, certain parameters may be used to make soft polishing pads including such a molded homogeneous polishing body 202 compatible with conventional processing equipment or even with conventional chemical mechanical processing operations. For example, in accordance with an embodiment of the present invention, molded homogeneous polishing body 202 has a thickness approximately in the range of 0.075 inches to 0.130 inches, e.g., approximately in the range of 1.9-3.3 millimeters. In one embodiment, molded homogeneous polishing body 202 has a diameter approximately in the range of 20 inches to 30.3 inches, e.g., approximately in the range of 50-77 centimeters, and possibly approximately in the range of 10 inches to 42 inches, e.g., approximately in the range of 25-107 centimeters. In one embodiment, molded homogeneous polishing body 202 has a hardness of approximately 35 Shore D. In one embodiment, molded homogeneous polishing body 202 has a pore density approximately in the range of 18%-30% total void volume, and possibly approximately in the range of 15%-35% total void volume. In one embodiment, molded homogeneous polishing body 202 has a porosity of the closed cell type. In one embodiment, molded homogeneous polishing body 202 has a pore size of approximately 40 micron diameter, but may be smaller, e.g., approximately 20 microns in diameter. In one embodiment, molded homogeneous polishing body 202 has a compressibility of approximately 2.5%. In one embodiment, molded homogeneous polishing body 202 has a density approximately in the range of 0.80-0.90 grams per cubic centimeter, or approximately in the range of 0.95-1.05 grams per cubic centimeter.

It is to be understood that removal rates of various films using a soft polishing pad including molded homogeneous polishing body 202 may vary depending on polishing tool, slurry, conditioning, or polish recipe used. However, in one embodiment, molded homogeneous polishing body 202 exhibits a copper removal rate approximately in the range of 30-900 nanometers per minute. In one embodiment, molded homogeneous polishing body 202 exhibits an oxide removal rate approximately in the range of 30-900 nanometers per minute. In one embodiment, molded homogeneous polishing body 202 has an elastic storage modulus, E', of approximately 30 MPa at 25 degrees Celsius. In one embodiment, molded homogeneous polishing body 202 has an elastic storage modulus, E', of approximately 25 MPa at 40 degrees Celsius. In one embodiment, molded homogeneous polishing body 202 has an elastic storage modulus, E', of approximately 20 MPa at 70 degrees Celsius. In one embodiment, molded homogeneous polishing body 202 has an elastic storage modulus, E', of approximately 18 MPa at 90 degrees Celsius. In one embodiment, molded homogeneous polishing body 202 has a tan delta that varies with temperature, from approximately 0.04 at T=−75 degrees Celsius to approximately 0.23 at T=−15 degrees Celsius, with a value of approximately 0.19 at 25 degrees Celsius. In one embodiment, molded homogeneous polishing body 202 has a kinetic energy loss factor, KEL (1/Pa) of approximately 10,500 at 25 degrees Celsius, approximately 13,500 at 40 degrees Celsius, or approximately 15,500 at 70 degrees Celsius. In accordance with an embodiment of the present invention, a soft polishing pad has a KEL approximately in the range of 2000-45,000 at 45 degrees Celsius.

In an aspect of the present invention, a soft polishing pad includes a molded homogeneous polishing body, such as molded homogeneous polishing body 202, fabricated from a non-polymeric urethane precursor that forms a single type of polyurethane polymer. For example, in accordance with an embodiment of the present invention, a molded homogeneous polishing body is fabricated by reacting (a) an aromatic urethane pre-polymer, such as AIRTHANE 60: polytetramethylene glycol-toluene diisocyanate, (b) a porogen, such as EXPANCEL 40: acrylonitrile vinylidiene chloride with an isobutene or pentane filler, (c) a lubricant and whiting agent filler (d) a polyol, such as Terathane T-2000: polyoxytetramethylene glycol, and (e) a catalyst, such as DABCO 1027 with (f) a curative, such as CURENE 107: thioether aromatic diamine, (g) a thermal stabilizer, such as PUR68, and (g) a UV absorber, such as Tinuvin 213 to form a nearly opaque buff-colored thermoset polyurethane having a substantially uniform microcellular, closed cell structure. The nearly opaque molded homogeneous polishing body may not be made from a plurality of polymeric materials, and a mixture of polymeric materials may not be formed by the above reaction. Instead, in an embodiment, the opaque pad molded homogeneous polishing body is made from a non-polymeric urethane precursor that forms a single type of polyurethane polymer. Also, in an embodiment, the molded homogeneous polishing body portion of a fabricated soft polishing pad does not include any water-soluble particles dispersed in the water-insoluble polymeric matrix opaque material. In one embodiment, the opaque region is uniformly hydrophobic in nature. In a specific embodiment, upon conditioning, portions become more hydrophilic so as to be wettable. In an embodiment, the above noted EXPANCEL material does not have a liquid core which is substantially all water. Instead the core of the EXPANCEL is a gas and the average pore size of each EXPANSEL unit is approximately in the range of 20 to 40 microns.

Figure 4:
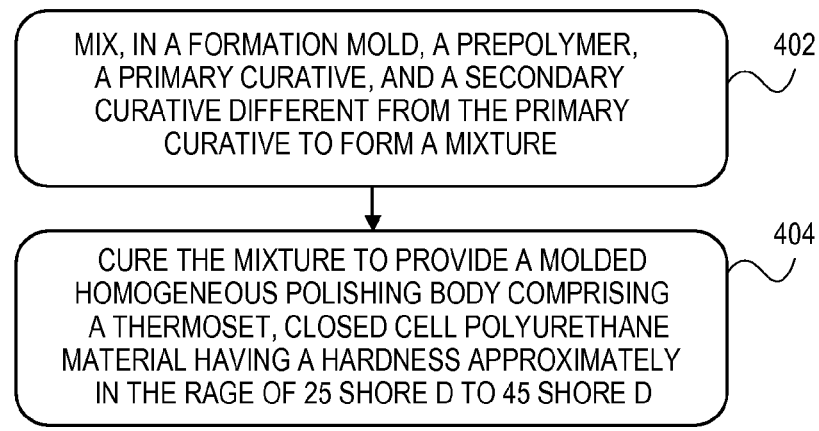
FIG. 4 is a Flowchart representing operations in a method of fabricating a soft polishing pad for polishing a semiconductor substrate, in accordance with an embodiment of the present invention.
Figure 5A:
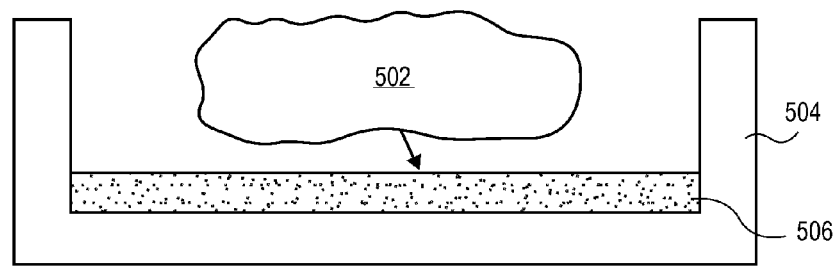
FIG. 5A illustrates a cross-sectional view of the fabrication of a soft polishing pad for polishing a semiconductor substrate, corresponding to operation 402 of the Flowchart of FIG. 4, in accordance with an embodiment of the present invention.
Figure 5B:
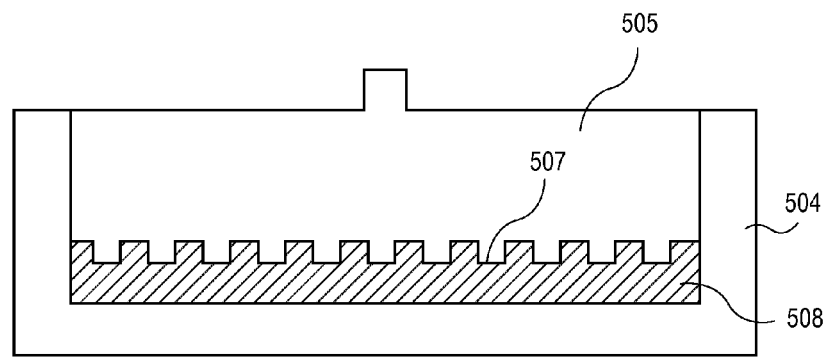
FIG. 5B illustrates a cross-sectional view of the fabrication of a soft polishing pad for polishing a semiconductor substrate, corresponding to operation 404 of the Flowchart of FIG. 4, in accordance with an embodiment of the present invention.
Figure 5C:
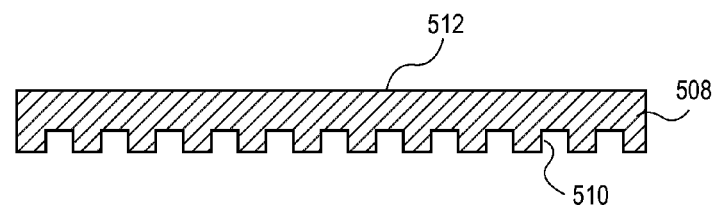
FIG. 5C illustrates a cross-sectional view of the fabrication of a soft polishing pad for polishing a semiconductor substrate, corresponding again to operation 404 of the Flowchart of FIG. 4, in accordance with an embodiment of the present invention.

As noted above, a soft polishing pad may be fabricated from a non-polymeric urethane precursor that forms a single type of polyurethane polymer. FIG. 4 is a Flowchart 400 representing operations in a method of fabricating a soft polishing pad for polishing a semiconductor substrate, in accordance with another embodiment of the present invention. FIGS. 5A-5C illustrate cross-sectional views of the fabrication of a soft polishing pad for polishing a semiconductor substrate, corresponding to the operations of Flowchart 400, in accordance with an embodiment of the present invention.

Referring to FIG. 5A and corresponding operation 402 of Flowchart 400, a method of fabricating a soft polishing pad for polishing a semiconductor substrate includes mixing, in a formation mold 504, a pre-polymer, a primary curative, and a secondary curative (combination 502) different from the primary curative to form a mixture 506.

In accordance with an embodiment of the present invention, the pre-polymer includes a polyurethane precursor, the primary curative includes an aromatic diamine compound, and the secondary curative includes an ether linkage. In one embodiment, the polyurethane precursor is an isocyanate, the primary curative is an aromatic diamine, and the secondary curative is a curative such as, but not limited to, polytetramethylene glycol, amino-functionalized glycol, or amino-functionalized polyoxopropylene. In an embodiment, pre-polymer, a primary curative, and a secondary curative (combination 502) has an approximate molar ratio of 100 parts pre-polymer, 85 parts primary curative, and 15 parts secondary curative. It is to be understood that variations of the ratio may be used to provide soft polishing pads with varying Shore D values, or based on the specific nature of the pre-polymer and the first and second curatives. In an embodiment, the mixing further includes mixing an opacifying lubricant with the pre-polymer, the primary curative, and the secondary curative.

Referring to FIG. 5B and corresponding operation 404 of Flowchart 400, the method of fabricating a soft polishing pad for polishing a semiconductor substrate also includes curing mixture 506 to provide a molded homogeneous polishing body 508.

In accordance with an embodiment of the present invention, curing mixture 506 includes partially curing, in formation mold 504, to provide a polyurethane material. In that embodiment, curing mixture 506 includes further curing, in an oven, to provide molded homogeneous polishing body 508. In an embodiment, formation mold 504 includes a lid 505 having a grooved pattern 507 formed thereon or formed therein, as depicted in FIG. 5B. The partial curing prior to the oven curing may be, in an embodiment, performed in the presence of lid 505 which encloses mixture 506 in formation mold 504, at a temperature approximately in the range of 200-260 degrees Fahrenheit and a pressure approximately in the range of 2-12 pounds per square inch.

Referring to FIG. 5C and again to corresponding operation 404 of Flowchart 400, molded homogeneous polishing body 508 is composed of a thermoset, closed cell polyurethane material having a hardness approximately in the range of 20 Shore D to 45 Shore D. In an embodiment, as a result of grooved pattern 507 of lid 505 of formation mold 504, molded homogeneous polishing body 508 includes a first, grooved surface 510, and a second, flat surface 512 opposite first surface 510, as depicted in FIG. 5C. In an embodiment, molded homogeneous polishing body 508 is opaque. In one embodiment, molded homogeneous polishing body 508 is opaque due to the inclusion of an opacifying lubricant.

Figure 6A:
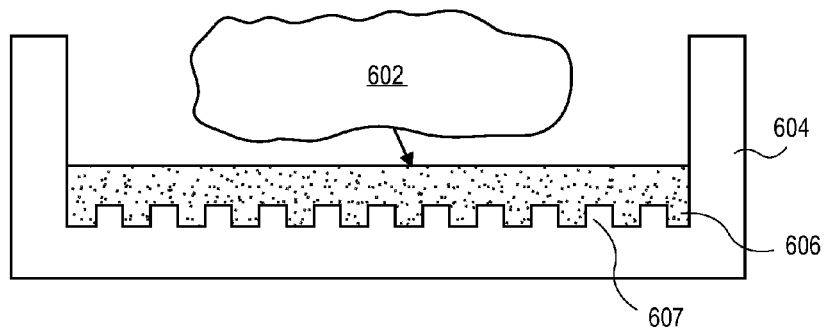
FIG. 6A illustrates a cross-sectional view of the fabrication of a soft polishing pad for polishing a semiconductor substrate, corresponding to operation 402 of the Flowchart of FIG. 4, in accordance with an embodiment of the present invention.
Figure 6B:
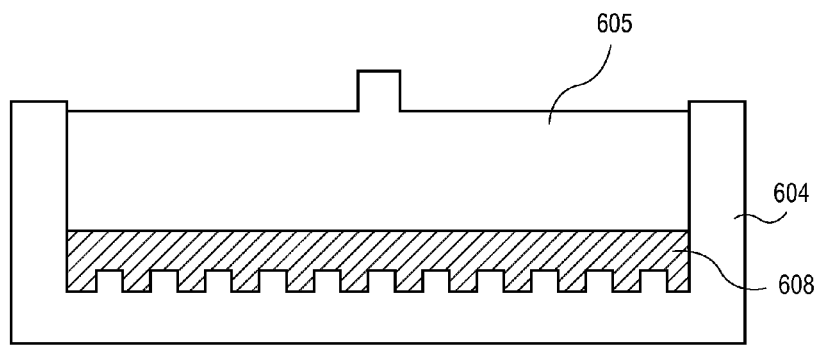
FIG. 6B illustrates a cross-sectional view of the fabrication of a soft polishing pad for polishing a semiconductor substrate, corresponding to operation 404 of the Flowchart of FIG. 4, in accordance with an embodiment of the present invention.
Figure 6C:
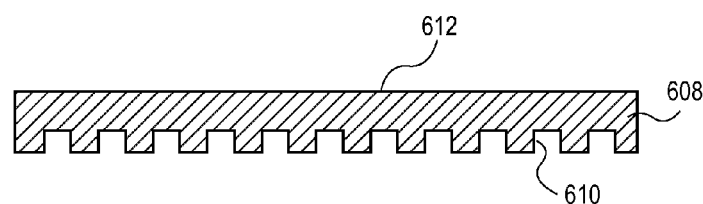
FIG. 6C illustrates a cross-sectional view of the fabrication of a soft polishing pad for polishing a semiconductor substrate, corresponding again to operation 404 of the Flowchart of FIG. 4, in accordance with an embodiment of the present invention.

In another aspect of the present invention, a soft polishing pad may be fabricated to include grooves formed during a molding process operation, but the grooved pattern need not necessarily be formed from inclusion of a grooved pattern in the lid of a formation mold. FIG. 4 is a Flowchart 400 representing operations in a method of fabricating a soft polishing pad for polishing a semiconductor substrate, in accordance with another embodiment of the present invention. FIGS. 6A-6C illustrate cross-sectional views of the fabrication of a soft polishing pad for polishing a semiconductor substrate, corresponding to the operations of Flowchart 400, in accordance with an embodiment of the present invention.

Referring to FIG. 6A and corresponding operation 402 of Flowchart 400, a method of fabricating a soft polishing pad for polishing a semiconductor substrate includes mixing, in a formation mold 604, a pre-polymer, a primary curative, and a secondary curative (combination 602) different from the primary curative to form a mixture 606.

In accordance with an embodiment of the present invention, the pre-polymer includes a polyurethane precursor, the primary curative includes an aromatic diamine compound, and the secondary curative includes an ether linkage. In one embodiment, the polyurethane precursor is an isocyanate, the primary curative is an aromatic diamine, and the secondary curative is a curative such as, but not limited to, polytetramethylene glycol, amino-functionalized glycol, or amino-functionalized polyoxopropylene. In an embodiment, pre-polymer, a primary curative, and a secondary curative (combination 502) has an approximate molar ratio of 100 parts pre-polymer, 85 parts primary curative, and 15 parts secondary curative. It is to be understood that variations of the ratio may be used to provide soft polishing pads with varying Shore D values. In an embodiment, the mixing further includes mixing an opacifying lubricant with the pre-polymer, the primary curative, and the secondary curative.

Referring to FIG. 6B and corresponding operation 404 of Flowchart 400, the method of fabricating a soft polishing pad for polishing a semiconductor substrate also includes curing mixture 606 to provide a molded homogeneous polishing body 608.

In accordance with an embodiment of the present invention, curing mixture 606 includes partially curing, in formation mold 604, to provide a polyurethane material. In that embodiment, curing mixture 606 includes further curing, in an oven, to provide molded homogeneous polishing body 608. In an embodiment, formation mold 604 includes a lid 605. However, different from lid 505 described above, lid 605 has a flat surface in contact with mixture 606. Instead, a grooved pattern 607 is included at the bottom surface of formation mold 604, as depicted in FIGS. 6A and 6B. The partial curing prior to the oven curing may be, in an embodiment, performed in the presence of lid 605 which encloses mixture 606 in formation mold 604, at a temperature approximately in the range of 200-260 degrees Fahrenheit and a pressure approximately in the range of 2-12 pounds per square inch.

Referring to FIG. 6C and again to corresponding operation 404 of Flowchart 400, molded homogeneous polishing body 608 is composed of a thermoset, closed cell polyurethane material having a hardness approximately in the range of 20 Shore D to 45 Shore D. In an embodiment, as a result of grooved pattern 607 at the bottom of formation mold 604, molded homogeneous polishing body 608 includes a first, grooved surface 610, and a second, flat surface 612 opposite first surface 610, as depicted in FIG. 6C. In an embodiment, molded homogeneous polishing body 608 is opaque. In one embodiment, molded homogeneous polishing body 608 is opaque due to the inclusion of an opacifying lubricant.

Embodiment for the formation of a soft polishing pad as described above may be readily applicable to more complex chemical formulations. For example, in accordance with another embodiment of the present invention, a method of fabricating a soft polishing pad for polishing a semiconductor substrate includes reacting, in a formation mold, an aromatic urethane pre-polymer, a porogen, a lubricant and whiting agent filler, a polyol, and a catalyst with a curative, a thermal stabilizer, and a UV absorber to form a mixture. In an embodiment, the aromatic urethane pre-polymer is composed of polytetramethylene glycol-toluene diisocyanate, the porogen is composed of acrylonitrile vinylidiene chloride with an isobutene or pentane filler, the lubricant and whiting agent filler is composed of an opacifying lubricant, the polyol is composed of polyoxytetramethylene glycol, the catalyst is composed of DABCO 1027, the a curative is composed of thioether aromatic diamine, the thermal stabilizer is composed of PUR68, and the UV absorber is composed of Tinuvin 213. The method of fabricating the soft polishing pad for polishing a semiconductor substrate may also include curing the above complex mixture to provide a molded homogeneous polishing body of the soft polishing pad.

In accordance with an embodiment of the present invention, the method of fabricating the soft polishing pad for polishing a semiconductor substrate further includes forming a carrier film above a surface of the molded homogeneous polishing body. In one embodiment, the carrier film is composed of polyethylene teraphthalate (PET). In one embodiment, the carrier film has a thickness of approximately 0.5 mils, e.g., approximately in the range of 10-15 microns. In one embodiment, the carrier film 414 is semi-transparent to light. In a specific embodiment, the carrier film is composed of polyethylene teraphthalate (PET), has a thickness of approximately 0.5 mils, e.g., approximately in the range of 10-15 microns, and is semi-transparent to light. In an embodiment, the carrier film is a MYLAR® polyethylene teraphthalate film. In a specific embodiment, the MYLAR® film is completely impermeable to water and has no holes formed therein.

In accordance with an embodiment of the present invention, the method of fabricating the soft polishing pad for polishing a semiconductor substrate further includes forming a first pressure-sensitive adhesive layer between the surface of the molded homogeneous polishing body and the carrier film. In an embodiment, the first pressure-sensitive adhesive layer is formed directly between the surface of the molded homogeneous polishing body and the carrier film. In one embodiment, forming the first pressure-sensitive adhesive layer includes forming a rubber-type material. In an embodiment, the first pressure-sensitive adhesive layer is a permanent-bond type adhesive.

In accordance with an embodiment of the present invention, the method of fabricating the soft polishing pad for polishing a semiconductor substrate further includes forming a second pressure-sensitive adhesive layer above the carrier film. In an embodiment, the second pressure-sensitive adhesive layer is formed directly on the carrier film. In one embodiment, forming the second pressure-sensitive adhesive layer includes forming an acrylic-type material. In an embodiment, the second pressure-sensitive adhesive layer is a releasable-bond type adhesive.

In accordance with an embodiment of the present invention, the method of fabricating the soft polishing pad for polishing a semiconductor substrate further includes forming a release liner above the second pressure-sensitive adhesive layer. In an embodiment, the release liner is formed directly above the second pressure-sensitive adhesive layer. In one embodiment, the release liner is composed of polyethylene teraphthalate (PET). In an embodiment, the release liner is a layer of MYLAR® polyethylene teraphthalate film having a thickness of approximately 2.5 mils, e.g., approximately in the range of 60-65 microns. In an alternative embodiment, however, the release liner is composed of a material such as, but not limited to, paper or polypropylene. Alternatively, a soft polishing pad may include only the molded homogeneous polishing body and a release liner. As such, in accordance with an alternative embodiment of the present invention, a method of fabricating a soft polishing pad for polishing a semiconductor substrate includes forming a release liner directly on a flat surface of the molded homogeneous polishing body. In one embodiment, the release liner is composed of polyethylene teraphthalate (PET).

In another aspect of the present invention, a local area transparency may be included in a soft polishing pad. For example, in an embodiment, a technique requiring visible access to the top surface of a substrate during a CMP operation is used to detect an end-point of the operation. However, as described above, the soft polishing pad may be opaque and therefore restrictive of a variety of possible techniques for such an end-point detection. FIG. 7 illustrates a cross-sectional view of a soft polishing pad for polishing a semiconductor substrate, the soft polishing pad including a local area transparency region, in accordance with an embodiment of the present invention.

Referring to FIG. 7, a molded homogeneous polishing body 702 of a soft polishing pad, such as soft polishing pad 200 described in association with FIG. 2, further includes a local area transparency (LAT) region 704 disposed in, and covalently bonded with, the molded homogeneous polishing body 702.

In an embodiment, molded homogeneous polishing body 702 is opaque, while LAT region 704 is not opaque. In one embodiment, molded homogeneous polishing body 702 is opaque due at least in part to inclusion of an inorganic substance in the material used to fabricate the molded homogeneous polishing body portion of a soft polishing pad. In that embodiment, the local area transparency region is fabricated exclusive of the inorganic substance and is substantially, if not totally, transparent to, e.g., visible light, ultra-violet light, infra-red light, or a combination thereof. In a specific embodiment, the inorganic substance included in molded homogeneous polishing body 702 is an opacifying lubricant, whereas the local area transparency portion does not contain any inorganic materials, including the opacifying lubricant. Thus, in one embodiment, molded homogeneous polishing body 702 is opaque and includes boron-nitride, while LAT region 704 is essentially free from an opacifying lubricant. In an embodiment, LAT region 704 is effectively transparent (ideally totally transparent) in order to enable transmission of light through a soft polishing pad for, e.g., end-point detection. However, it may be the case that LAT region 704 cannot or need not be fabricated to be perfectly transparent, but may still be effective for transmission of light for end-point detection. For example, in one embodiment, LAT region 704 transmits as little as 80% of incident light in the 700-710 nanometer range, but is still suitable to act as a window within a soft polishing pad.

In an embodiment, molded homogeneous polishing body 702 and LAT region have different hardnesses. For example, in one embodiment, molded homogeneous polishing body 702 has a Shore D less than the Shore D of LAT region 704. In a specific embodiment, molded homogeneous polishing body 702 has a Shore D approximately in the range of 20-45, while LAT region 704 has a Shore D of approximately 60. Although the hardnesses may differ, cross-linking (e.g., via covalent bonding) between LAT region 704 and molded homogeneous polishing body 702 may still be extensive. For example, in accordance with an embodiment of the present invention, the difference in Shore D of molded homogeneous polishing body 702 and LAT region 704 is 10 or greater, yet the extent of cross-linking between molded homogeneous polishing body 702 and LAT region 704 is substantial.

It is to be understood that the dimensions of a soft polishing pad and a LAT region disposed therein may vary according to desired application. For example, in one embodiment, molded homogeneous polishing body 702 is circular with a diameter approximately in the range of 75-78 centimeters, and LAT region 704 has a length approximately in the range of 4-6 centimeters along a radial axis of molded homogeneous polishing body 702, a width approximately in the range of 1-2 centimeters, and is positioned approximately in the range of 16-20 centimeters from the center of molded homogeneous polishing body 702.

With respect to vertical positioning, the location of a LAT region on a molded homogeneous polishing body may be selected for particular applications, and may also be a consequence of the formation process. For example, by including a LAT region in a molded homogeneous polishing body via the molding process, the positioning and accuracy achievable may be significantly more tailored than, e.g., a process in which a polishing pad is cut after formation and a window insert is added after the formation of the pad. In an embodiment, by using a molding process as described below, an LAT region is included in a molded homogeneous polishing body to be planar with the bottoms of the troughs of a grooved surface of the molded homogeneous polishing body. In a specific embodiment, by including the LAT region to be planar with the bottoms of the troughs of a grooved surface of the molded homogeneous polishing body, the LAT region does not interfere with CMP processing operations throughout the life of a soft polishing pad fabricated from the molded homogeneous polishing body and the LAT region.

In another embodiment, by using a molding process as described below, an LAT region is included in a molded homogeneous polishing body to be planar with the opposing flat surface of the molded homogeneous polishing body. This planarity may be achieved by grinding the back-side of the molded homogeneous polishing body until the LAT region is exposed or may be made planer at the time of molding. In either case, in accordance with an embodiment of the present invention, there is no recess of the LAT region into the backside of the molded homogeneous polishing body. As such, there is little to no likelihood of undesirably trapping air or moisture between a platen of a CMP tool and an LAT region of a soft polishing pad when the soft polishing pad is used with the CMP tool for CMP process operations.

In an embodiment, a soft polishing pad including an LAT region may be adhered to the CMP platen by a sticky film or residue interface without the addition of intervening layers. For example, in one embodiment, the backing (planar side opposite the grooved surface) of the molded homogeneous polishing body portion of a soft polishing pad with an LAT region has a layer of transfer tape disposed thereon. Upon removal of the transfer tape, e.g. at the time of use of the soft polishing pad on a CMP tool, a sticky interface is created enabling application of the molded homogeneous polishing body and the LAT region directly to a platen of the CMP tool. In an embodiment, the LAT region is placed over a light-emitting end-point detection system included with the platen. In one embodiment, the sticky interface between the molded homogeneous polishing body and the platen, and hence between the LAT region and the platen, is entirely or mostly transparent and does not interfere with the transmission of light from an end-point detection system through the LAT region. In a specific embodiment, the sticky interface is an acrolate interface. In an embodiment, since additional polishing pad layers are not retained between the molded homogeneous polishing body and the platen, the cost and time associated with otherwise cutting windows in and aligning such layers with the LAT region are not required.

Figure 8:
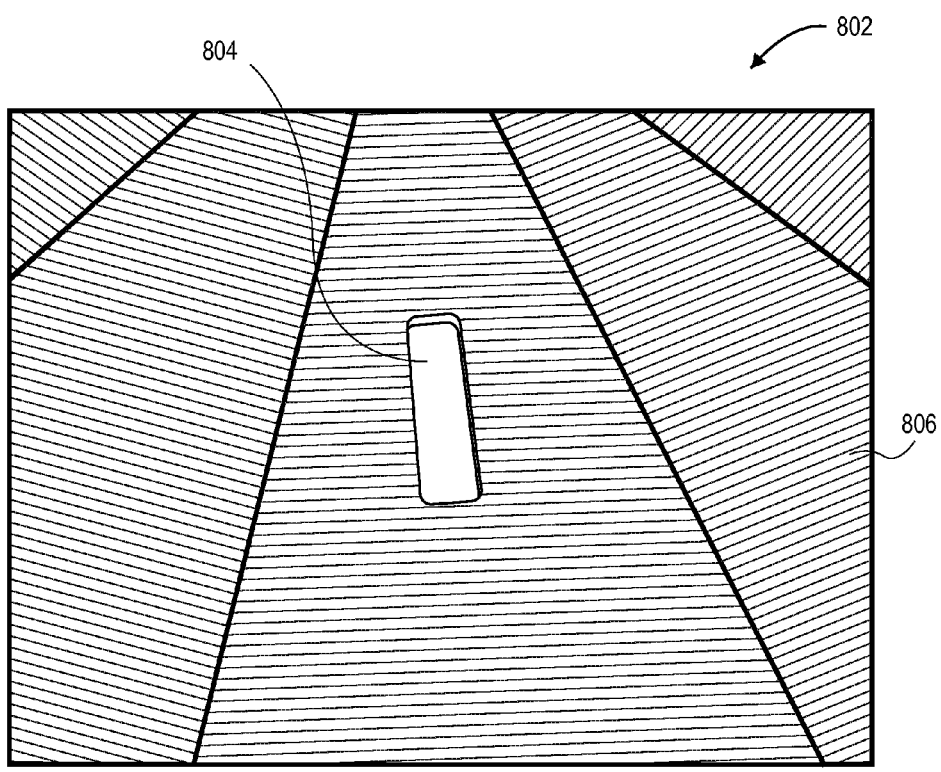
FIG. 8 illustrates an angled view of a portion of a soft polishing pad having a local area transparency (LAT) region incorporated therein, in accordance with an embodiment of the present invention.

Accordingly, in an embodiment, a local area transparency region is incorporated into a soft polishing pad. In one embodiment, the local area transparency is included during the actual molding and formation of the pad, such that reactant precursors used to form the pad are disposed to surround a pre-fabricated local area transparency positioned in a formation mold. The soft polishing pad material is then cured in the presence of the local area transparency, thus incorporating the local area transparency into the soft polishing pad itself. For example, FIG. 8 illustrates an angled view of a portion of a soft polishing pad having a local area transparency incorporated therein, in accordance with an embodiment of the present invention. Referring to FIG. 8, soft polishing pad 802 includes a local area transparency (LAT) region 804 incorporated therein. In an embodiment, local area transparency region 804 is recessed below grooves 806 of the grooved surface of soft polishing pad 802, as depicted in FIG. 8.

The local area transparency region may have a dimension and be located in a position compatible with various end-point detection techniques and suitable for inclusion in a soft polishing pad fabricated by a molding process. For example, in accordance with an embodiment of the present invention, a local area transparency region has a length of approximately 2 inches, e.g. approximately in the range of 4-6 centimeters, and a width of approximately 0.5 inches, e.g. approximately in the range of 1-2 centimeters. In an embodiment, the local area transparency region is positioned approximately 7 inches, e.g. approximately in the range of 16-20 centimeters from the center of a soft polishing pad, such as but not limited to a soft polishing pad having a diameter of 30 inches, e.g. a diameter approximately in the range of 75-78 centimeters.

The local area transparency region may be composed of a material compatible with various end-point detection techniques and suitable for inclusion in a soft polishing pad fabricated by a molding process. For example, in accordance with an embodiment of the present invention, a local area transparency region is formed to be housed in a molded homogeneous polishing body during operations 402 and 404 of Flowchart 400, described above.

For example, in accordance with an embodiment of the present invention, the method of fabricating the soft polishing pad for polishing a semiconductor substrate, as described in association with Flowchart 400, further includes, prior to mixing the pre-polymer and the primary curative and the secondary curative, mixing an aromatic urethane pre-polymer with a curative in a second, separate, formation mold to form a second mixture. The second mixture is then partially cured in the second formation mold to form a molded gel. The molded gel is then positioned in a designated region of the formation mold.

In accordance with an embodiment of the present invention, mixing the pre-polymer and the primary curative and the secondary curative to form the soft polishing pad mixture includes forming the soft polishing pad mixture at least partially surrounding the molded gel. In an embodiment, curing the soft polishing pad mixture to provide the molded homogeneous polishing body further includes curing the molded gel to provide a local area transparency (LAT) region disposed in, and covalently bonded with, the molded homogeneous polishing body.

In one embodiment, curing the soft polishing pad mixture and the molded gel includes partially curing, in the soft polishing pad formation mold, to provide a polyurethane material (polishing body precursor) and to provide an LAT region precursor. In that embodiment, curing the soft polishing pad mixture and the molded gel includes further curing, in an oven, to provide the molded homogeneous polishing body composed of a thermoset, closed cell polyurethane material, and to provide the LAT region.

In accordance with an embodiment of the present invention, in forming the LAT region, the aromatic urethane pre-polymer includes polytetramethylene glycol-toluene diisocyanate, and the curative includes thioether aromatic diamine. In one embodiment, partial curing of the second (LAT region precursor) mixture is performed solely with thermal energy. In an embodiment, the aromatic urethane pre-polymer is composed of a high molecular weight polyol.

In an embodiment, a method of fabricating a local area transparency region for a soft polishing pad includes reacting, in a formation mold, an aromatic urethane pre-polymer with a curative to form a mixture. In one embodiment, the aromatic urethane pre-polymer is composed of polytetramethylene glycol-toluene diisocyanate (AIRTHANE 60), and the curative is composed of thioether aromatic diamine (CURENE 107). Thus, in an embodiment, the local area transparency region is not made from a plurality of polymeric materials, and a mixture of polymeric materials is not made by the above reaction. Instead, the local area transparency region is made from a non-polymeric urethane precursor that forms a single type of polyurethane polymer. Also, the resulting polymer forming the local area transparency region is not a non-ambering urethane elastomer. Furthermore, in an embodiment, there are no water-soluble particles dispersed in the water-insoluble polymeric matrix used to form the local area transparency region. In an embodiment, the local area transparency region is not made of gas-permeable material, a glass or, a crystalline material. The optional local area transparency regions may be made by first mixing the above-noted local area transparency region precursor ingredients (except for the curative) together in blend tank equipped with a mechanical stirrer and nitrogen gas head space. In accordance with an embodiment of the present invention, the mixture, after being thoroughly blended, is transferred to a formation mold via a mixing head where the curative is added to the mixture used to form the molded homogeneous polishing body portion of the soft polishing pad.

In an embodiment, a method of fabricating a local area transparency region for a soft polishing pad also includes partially curing, in a formation mold, the above mixture to form a molded gel that will ultimately be transformed to provide the LAT. In an embodiment, the mixture is partially cured in the LAT formation mold to make a transparent gel-like article of the desired local area transparency region shape. In one embodiment, the mixture is partially cured solely by thermal energy, and not by photo-curing or other techniques.

In an embodiment, a method of fabricating a local area transparency (LAT) region for a soft polishing pad also includes forming, at the top surface of the molded gel, a support film. In accordance with an embodiment of the present invention, the support film is composed of a polyimide film (e.g., a commercially available KAPTON polyimide film). In one embodiment, the support film is positioned at the top of the molded gel to support the window-precursor during transfer to a larger pad formation mold.

In an embodiment, a method of fabricating a local area transparency region for a soft polishing pad also includes positioning the molded gel in a designated region of the lid of a soft polishing pad formation mold. In an embodiment, the support film is removed at this point. In accordance with an embodiment of the present invention, the designated region is designed to accept and position the molded gel. In an embodiment, a polymeric sleeve is not used to hold the molded gel in or on the lid of the soft polishing pad formation mold. In an embodiment, the molded gel is positioned in the soft polishing pad formation mold such that the top of a local area transparency region formed there from is below the level of the portion of the lid of the soft polishing pad formation mold provided to generate a polishing surface (or groove area) in a soft polishing pad formed surrounding the local area transparency region.

In an embodiment, a method of fabricating a local area transparency region for a soft polishing pad also includes reacting, in the soft polishing pad formation mold, soft polishing pad precursors to form a mixture surrounding the molded gel in the designated region once the lid of the soft pad formation mold is placed on the soft polishing pad precursor mixture. In accordance with an embodiment of the present invention, the soft polishing pad mixture is composed of materials and is formed in a manner similar to or the same as mixture 506 described in association with operation 402 of Flowchart 400.

In an embodiment, a method of fabricating a local area transparency region for a soft polishing pad also includes completely curing the soft polishing pad mixture and the molded gel to provide a molded homogeneous polishing body having a local area transparency region disposed therein. In accordance with an embodiment of the present invention, the molded homogeneous polishing body is composed of materials and is formed in a manner similar to or the same as molded homogeneous polishing body 508 described in association with operation 404 of Flowchart 400.

Upon fabrication of a molded homogeneous polishing body having a local area transparency region disposed therein, additional operations (such as the addition of backing layers, thinning the pad, etc.) may optionally be performed to further complete fabrication of a soft polishing pad. Thus, a soft polishing pad may be fabricated to include a local area transparency region, e.g., for end-point detection. The end-point detection may include the transmission of light through the LAT of the soft polishing pad. Further details that may be used to form such a soft polishing pad with a local area transparency region are provided below.

In accordance with an embodiment of the present invention, to form a soft polishing pad, liquid opaque pad precursors are added to three or four separate blend tanks each equipped with a mechanical stirrer and nitrogen gas head space. A first blend tank contains a pre-polymer, an opacifying lubricant and whiting agent filler, and a porogen. A second blend tank contains a curative, a UV stabilizer and a heat stabilizer. A third blend tank contains a polyol and a catalyst. Alternatively, the catalyst may be held in a fourth blend tank. The mixtures in blend tanks, after being thoroughly mixed, are transferred to a separate day tank via a vacuum. When ready for use, each mixture is transferred to a CMP soft polishing pad mold via a mixing head where the ingredients react. The opaque precursor mix is added into the mold to fill up the rest of the mold and generally surround a local area transparency region. In an embodiment, the mixing apparatus used in this operation is a Baule mixing system.

In an embodiment, prior to adding the optional gel-like insert (LAT precursor) and the opaque portion, the mold is preheated to approximately 250 degrees Fahrenheit, or approximately 121 degrees Celsius. After the insert is positioned in the mold and the opaque portion fills the rest of the mold, the mold is closed and heated for about 8 minutes to partially cure the opaque material and further cure the gel insert (transparent material). Since the thermal mass of the top and bottom portions of the mold may make it impractical to cycle the mold temperature during the production of a soft polishing pad, the inside of the mold stays at about the processing temperature consistently while production is being performed. In an embodiment, the partially cured material which is solid-like is "demolded" and removed from the mold.

In an embodiment, the solid-like partially cured pad is then moved to a curing oven and heated for approximately 12 hours at approximately 200 degrees Fahrenheit, or approximately 93 degrees Celsius. The heating may completely cure the pad. The cured pad is then removed from the oven, and the back side of the pad and the local area transparency region is machined (the front or grooved side is not treated at all), so that the bottom surface of the opaque portion of the pad is flush with the bottom surface of the local area transparency region. Furthermore, the machining may cause the desired pad thickness to be achieved.

In an embodiment, a transparent MYLAR® layer is then disposed over the bottom surface of the cured and machined pad. A roll of MYLAR® film having a first pressure sensitive adhesive on one side of the film and a second pressure sensitive adhesive and release sheet on the other side is unrolled and brought into contact with the bottom pad surface through a laminator. The MYLAR® roll is positioned and cut so that MYLAR® carrier film covers the overall bottom surface of the pad. Thus, a composite of the pad/adhesive layer/MYLAR® film/adhesive layer/MYLAR® release layer is created. Alternatively, a "transfer adhesive" is used instead of the above described roll of MYLAR® film. This "transfer film" may be an adhesive/release sheet which is unrolled and the adhesive layer is adhered to the bottom of the soft polishing pad. In that embodiment, the release pad is left in contact with that adhesive layer.

In an embodiment, the above described layer composite is then cleaned, inspected and packed for shipment as a soft polishing pad. In an embodiment, when the pad is needed for use, the release layer is removed from the composite, exposing the second adhesive layer. The composite is then positioned against a CMP machine platen with the exposed adhesive layer adhering to the platen. The release layer may be disposed of after removal. Alternatively, if the soft polishing pad has no carrier film, the release liner may be removed, and the single adhesive layer placed against the platen. In an embodiment, the installed soft polishing pad is then ready to be used in the CMP polishing operation.

It is to be understood that the properties of soft polishing pads achievable based on the above disclosed approaches may be varied to be slightly different (e.g., in hardness) for specific applications. For example, in accordance with another embodiment of the present invention, a soft polishing pad suitable for polishing semiconductor substrates is provided. The soft polishing pad includes a cast polyurethane polymeric material having a hardness of about 20 Shore D to about 40 Shore D, a density of about 0.85 grams per cubic centimeter to about 1.00 grams per cubic centimeter, a KEL of about 1050 to about 1400 (1/Pa at 40 degrees Celsius), and a porosity of about 10% to about 30% by volume. In one embodiment, the soft polishing pad has a hardness from about 20 Shore D to about 35 Shore D. In one embodiment, the soft polishing pad has a density from about 0.88 grams per cubic centimeter to about 0.95 grams per cubic centimeter. In one embodiment, the soft polishing pad has a KEL from about 1100 to 1350 (1/Pa at 40 degrees Celsius). In one embodiment, the soft polishing pad has a porosity from about 15% to 25% by volume.

It is also to be understood that curing reaction products, "completely curing, may still leave some residual reactants or by-products in the final soft polishing pad. For example, in accordance with another embodiment of the present invention, a soft polishing pad suitable for polishing semiconductor substrates is provided. The soft polishing pad includes a cast polyurethane polymeric material formed from polymeric microspheres, wherein the polymeric microspheres constitute about 10 to about 40 volume percent of the soft polishing pad. The soft polishing pad also includes an isocyanate-terminated reaction product having from about 6 to about 8 weight percent unreacted NCO. In an embodiment, the isocyanate-terminated reaction product is cured with a curative agent including a mixture of at least one curative polyamine compound and at least one curative hydroxyl-functional compound. In an embodiment, the molar ratio of the curative polyamine compound to the hydroxyl-functional compound is from about 1:1 to about 20:1. In an embodiment, the soft polishing pad has a porosity of at least 0.1 volume percent and a hardness of about Shore D 20 to about Shore D 40, e.g., approximately in the range of about Shore A 60 to about Shore A 90.

Thus, soft polishing pads for polishing semiconductor substrates have been disclosed. In accordance with an embodiment of the present invention, a soft polishing pad includes a molded homogeneous polishing body including a thermoset, closed cell polyurethane material having a hardness approximately in the range of 20 Shore D to 45 Shore D. In one embodiment, the molded homogeneous polishing body includes a first, grooved surface, and a second, flat surface opposite the first surface. In one embodiment, a local area transparency (LAT) region is disposed in, and covalently bonded with, the molded homogeneous polishing body. In accordance with another embodiment of the present invention, a method of fabricating a soft polishing pad for polishing a semiconductor substrate includes mixing, in a formation mold, a pre-polymer, a primary curative, and a secondary curative different from the primary curative to form a mixture. The mixture is cured to provide a molded homogeneous polishing body including a thermoset, closed cell polyurethane material having a hardness approximately in the range of 20 Shore D to 45 Shore D. In one embodiment, the pre-polymer includes a polyurethane precursor, the primary curative includes an aromatic diamine compound, and the secondary curative includes an ether linkage.

What is claimed is:

1. A method of fabricating a soft polishing pad for polishing a semiconductor substrate, the method comprising:
    mixing a pre-polymer, a primary curative, and a secondary curative different from the primary curative to form a mixture, wherein the primary curative is a diamine compound and the secondary curative is a diol compound, wherein mixing the pre-polymer, the primary curative, and the secondary curative to form the mixture comprises mixing with an approximate molar ratio of 100 parts of the pre-polymer, 85 parts of the primary curative, and 15 parts of the secondary curative; and
    curing the mixture to provide a homogeneous polishing body comprising a thermoset, closed cell polyurethane material having a hardness approximately in the range of 20 Shore D to 40 Shore D.

2. The method of claim 1, wherein the pre-polymer comprises a polyurethane precursor and the primary curative is an aromatic diamine compound.

3. The method of claim 2, wherein the polyurethane precursor is an isocyanate and the secondary curative is polytetramethylene glycol.

4. The method of claim 1, wherein curing the mixture comprises partially curing in a formation mold to provide a polyurethane material, and further curing, in an oven, to provide the homogeneous polishing body comprising the thermoset, closed cell polyurethane material.

5. The method of claim 1, wherein the homogeneous polishing body comprises a first, grooved surface, and a second, flat surface opposite the first surface.

6. The method of claim 1, wherein the mixing further comprises mixing an opacifying lubricant with the pre-polymer, the primary curative, and the secondary curative, and wherein the homogeneous polishing body is opaque.

7. The method of claim 4, further comprising:
    prior to mixing the pre-polymer and the primary curative and the secondary curative, mixing an aromatic urethane pre-polymer with a curative in a second, separate, formation mold to form a second mixture;
    partially curing, in the second formation mold, the second mixture to form a molded gel; and
    positioning the molded gel in a designated region of the formation mold, wherein mixing the pre-polymer and the primary curative and the secondary curative to form the mixture comprises forming the mixture at least partially surrounding the molded gel, and wherein curing the mixture to provide the homogeneous polishing body further comprises curing the molded gel to provide a local area transparency (LAT) region disposed in, and covalently bonded with, the homogeneous polishing body.

8. The method of claim 7, wherein curing the mixture comprises partially curing, in the formation mold, to provide the polyurethane material and to provide an LAT region precursor, and further curing, in the oven, to provide the homogeneous polishing body comprising the thermoset, closed cell polyurethane material and to provide the LAT region.

9. The method of claim 7, wherein the aromatic urethane pre-polymer comprises polytetramethylene glycol-toluene diisocyanate, and the curative comprises thioether aromatic diamine.

10. The method of claim 7, wherein the partial curing of the second mixture is performed solely with thermal energy.

11. The method of claim 1, wherein the pre-polymer is polytetramethylene glycol-toluene diisocyanate, the primary curative is a thioether aromatic diamine, and the secondary curative is polyoxytetramethylene glycol.

12. The method of claim 1, wherein the mixture further includes a catalyst.

13. A soft polishing pad for polishing a semiconductor substrate, the soft polishing pad comprising:
    a homogeneous polishing body comprising a thermoset, closed cell polyurethane material fabricated from polytetramethylene glycol-toluene diisocyanate as a pre-polymer, a thioether aromatic diamine as a primary curative, and polyoxytetramethylene glycol as a secondary curative, wherein the pre-polymer, the primary curative, and the secondary curative have an approximate molar ratio of 100 parts of the pre-polymer, 85 parts of the primary curative, and 15 parts of the secondary curative, the homogeneous polishing body having a hardness approximately in the range of 20 Shore D to 40 Shore D.

14. The soft polishing pad of claim 13, wherein the homogeneous polishing body comprises a first, grooved surface, and a second, flat surface opposite the first surface.

15. The soft polishing pad of claim 13, wherein the homogeneous polishing body comprises an opacifying lubricant.

16. The soft polishing pad of claim 13, wherein the polyurethane material fabricated is further fabricated from a catalyst.

17. The soft polishing pad of claim 13, wherein the homogeneous polishing body is a molded homogeneous polishing body.

18. A method of fabricating a soft polishing pad for polishing a semiconductor substrate, the method comprising:
    mixing, in a formation mold, a pre-polymer, a primary curative, and a secondary curative different from the primary curative to form a mixture, wherein mixing the pre-polymer, the primary curative, and the secondary curative to form the mixture comprises mixing with an approximate molar ratio of 100 parts of the pre-polymer, 85 parts of the primary curative, and 15 parts of the secondary curative; and
    curing the mixture to provide a molded homogeneous polishing body comprising a thermoset, closed cell polyurethane material having a hardness approximately in the range of 20 Shore D to 45 Shore D.

19. The method of claim 18, wherein the pre-polymer comprises a polyurethane precursor, the primary curative comprises an aromatic diamine compound, and the secondary curative comprises an ether linkage.

20. The method of claim 19, wherein the polyurethane precursor is an isocyanate, the primary curative is an aromatic diamine, and the secondary curative is selected from the group consisting of polytetramethylene glycol, amino-functionalized glycol, and amino-functionalized polyoxopropylene.

21. The method of claim 18, wherein the mixing further comprises mixing an opacifying lubricant with the pre-polymer, the primary curative, and the secondary curative, and wherein the molded homogeneous polishing body is opaque.

22. The method of claim 18, wherein the pre-polymer is polytetramethylene glycol-toluene diisocyanate, the primary curative is a thioether aromatic diamine, and the secondary curative is polyoxytetramethylene glycol.

23. The method of claim 18, wherein the mixture further includes a catalyst.

24. A soft polishing pad for polishing a semiconductor substrate, the soft polishing pad comprising:
a homogeneous polishing body comprising a thermoset, closed cell polyurethane material fabricated from a polyurethane precursor pre-polymer, a primary curative, and a secondary curative different from the primary curative, wherein the primary curative is a diamine compound and the secondary curative is a diol compound, wherein the polyurethane precursor pre-polymer, the primary curative, and the secondary curative have an approximate molar ratio of 100 parts of the polyurethane precursor pre-polymer, 85 parts of the primary curative, and 15 parts of the secondary curative, the homogeneous polishing body having a hardness approximately in the range of 20 Shore D to 40 Shore D.

25. The soft polishing pad of claim 24, wherein the homogeneous polishing body comprises a first, grooved surface, and a second, flat surface opposite the first surface.

26. The soft polishing pad of claim 24, wherein the homogeneous polishing body comprises an opacifying lubricant.

27. The soft polishing pad of claim 24, wherein the polyurethane material fabricated is further fabricated from a catalyst.

28. The soft polishing pad of claim 24, wherein the homogeneous polishing body is a molded homogeneous polishing body.

* * * * *